Patented Mar. 5, 1940

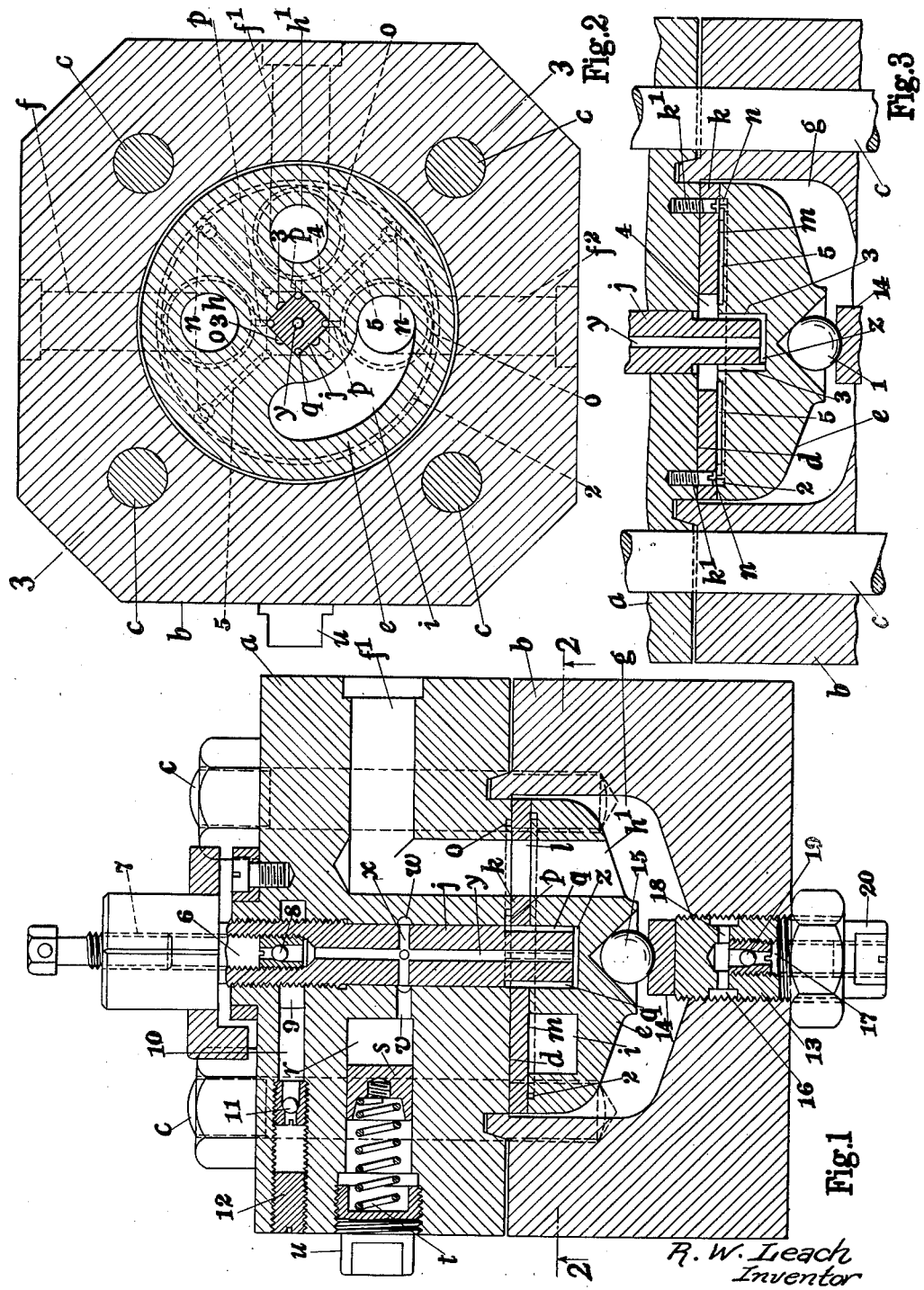

2,192,835

UNITED STATES PATENT OFFICE 2,192,835

VALVE FOR CONTROLLING FLUIDS

Robert William Leach, Newport, England

Application December 22, 1938, Serial No. 247,272
In Great Britain February 19, 1938

4 Claims. (Cl. 251—84)

This invention relates to fluid-controlling valves of the kind in which the closure member is in the form of an angularly movable disc or the like having a face adapted to co-operate with a complementary seating member.

The object of the invention is to facilitate renewal of either or both of the contiguous surfaces of the seating or closure members.

The invention comprises the combination of a ported seating member, a ported closure member which is movable angularly in relation to said seating member, a renewable ported plate arranged between and having its faces contiguous with complementary faces of said seating and closure members, and means for holding said plate against rotational movement relatively to one of said members, one of said contiguous faces at each side of said plate being grooved to receive lubricant or sealing substance under pressure for preventing fluid leakage over the faces of said plate.

In the accompanying sheet of explanatory drawings—

Figure 1 is a sectional elevation of a valve embodying the invention.

Figure 2 is a section on the line 2—2 of Figure 1 looking in the direction of the arrows.

Figure 3 is a section on the line 3—3 of Figure 2.

The body of the valve shown in the drawing is composed of two parts $a$, $b$ secured together by screws or bolts $c$. The part $a$ of the valve body is formed with a flat face $d$ so that it can serve as a seating member for an angularly movable disc-like closure member $e$, and is also formed with fluid inlet and outlet passages $f$, $f^1$ and $f^2$, the closure member $e$ being adapted to control the flow of fluid through these passages, and being arranged in a chamber $g$ formed in the other part $b$ of the valve body.

When the closure member $e$ is in the position shown in the drawing the passages $f$, $f^1$ intercommunicate through holes $h$, $h^1$ in the closure member and the space in the chamber $g$ unoccupied by the closure member. By moving the closure member $e$ from the position shown through 90° in a counter-clockwise direction the passages $f^1$, $f^2$ are caused to communicate with each other through an arcuate groove or channel $i$ in the adjacent surface of the closure member, and the passage $f$ is caused to communicate with the chamber $g$ through the hole $h^1$ in the closure member. In both of these positions of the closure member $e$ pressure fluid admitted to the chamber $g$ from the passage $f$, which is the fluid inlet passage, serves to assist in holding the closure member in position.

Extending through and rotatably supported by the body part $a$ is an operating stem $j$ for the closure member $e$, the outer end of the stem being adapted to be manipulated by hand or by any convenient implement and the inner end of the stem being of square or other convenient non-circular form, and being arranged in a complementary socket formed in the closure member $e$, so that the latter can be moved angularly by the stem.

In applying my invention to the fluid controlling valve above described, I arrange on the flat face $d$ of the body part $a$ a renewable thin plate $k$ made from metal or other suitable hard material which provides the seating surface $m$ required to co-operate with the adjacent flat face of the angularly movable closure member $e$. The plate $k$ is formed with ports or passages $l$ corresponding to the passages $f$, $f^1$ and $f^2$ in the seating member formed by the body part $a$. Also the plate $k$ is adapted to be held in non-rotatable and non-slidable connection with the seating member $a$ by dowels or the like $k^1$ secured to the seating member and extending into but not completely through, corresponding holes $n$ in the plate.

To prevent fluid leakage between the contiguous faces of the seating member $a$ and the plate $k$ I form in either of these faces (the face $d$ of the seating member $a$ in the example shown) and around each part $l$ an annular groove $o$ into which lubricant or sealing substance is introduced under pressure. The annular grooves $o$ communicate through radial or other grooves $p$ in the face $d$ of the seating member with a central square or other non-circular aperture 4 in the plate $k$, and this aperture communicates with longitudinal grooves 3 in the interior of the socket formed in the closure member $e$ for accommodating the inner end of the operating stem $j$. For preventing interruption of the communication between the aperture 4 and the radial or other grooves $p$ when the closure member $e$ is in either of the two service positions above mentioned, longitudinal grooves $q$ are formed in the inner end of the stem $j$. Lubricant or sealing substance is supplied to the plate $k$, and thence to the annular grooves $o$ in the seating member, from a chamber $r$ in the body part $a$ under the action of a piston $s$ in this chamber, the piston being subject to the action of a spring $t$ arranged between the piston and a plug $u$ screwed into the body part $a$. Alternatively, or in addition, the piston s may be subject to the pressure of the fluid controlled by the valve. The chamber r communicates through a passage v, and an annular groove w in the portion of the body part a surrounding the stem j, with radial passages x formed in the stem, and these radial passages communicate with an axial passage y passing through the stem. Also the axial passage y communicates at its inner end with the longitudinal grooves 3 in the stem socket through a space z formed in the closure member by the inner end of the stem socket.

Further, to prevent fluid leakage between the contiguous faces of the plate k and closure member e I form in and near the periphery of either of these faces (that of the closure member in the example shown) an annular groove 2 into which lubricant or sealing substance is introduced under pressure. When the closure member e is in either of the two service positions above mentioned the aperture 4 in the plate k communicates through radial or other grooves 5 in the closure member, and through the adjacent ends of the dowel or like holes n in the plate, with the annular groove 2 in the closure member for permitting lubricant or sealing substance to pass to this groove from the aperture 4. But in other positions of the closure member e communication between the aperture 4 and the radial or other grooves 5, and between the latter and the holes n, is interrupted.

Replenishing of the chamber r with lubricant or sealing substance can be effected from a storage chamber 6 formed in the outer end of the stem j and having a screwed plug 7 whereby lubricant or sealing substance can be forced from the storage chamber 6 past a non-return valve or valves as 8 and through the outer end of the axial passage y in the stem to the chamber r.

Near its upper end the operating stem j is preferably in screw thread connection with the adjacent portion of the body part a as shown, and for preventing leakage of fluid past this connection the screw thread in the body portion a is interrupted by an annular groove or channel 9 into which lubricant or sealing substance is introduced under pressure through a bore 10 in the body part. This bore 10 contains a non-return valve 11, and is closed at its outer end by a screw 12 whereby the lubricant or sealing substance can be forced past the non-return valve 11 into the groove or channel 9.

For adjustably holding the closure member e on its seating I employ a plug 13 which is screwed into the body part b, and which acts on the closure member through a thrust piece 14 and a ball 15, the action of the plug 13 being assisted as above described by the action of the fluid controlled by the valve when the closure member e occupies certain positions.

To prevent leakage of fluid past the plug 13 its screw thread is interrupted at an intermediate position by an annular groove or channel 16 into which lubricant or sealing substance is introduced under pressure through an axial bore 17 and radial bores 18 in the plug 13. The axial bore 17 contains a non-return valve 19, and is closed at its outer end by a screw 20 whereby the lubricant or sealing substance can be forced past the non-return valve 19 into the groove or channel 16.

If desired the renewable plate k above described may be arranged in combination with the closure member e instead of being combined with the seating member a, or a similar plate may be provided on both the closure member and the seating member.

By this invention I am able to provide for the convenient renewal of either or both of the surfaces liable to become worn in service, and also to prevent in a simple manner leakage of fluid between the contiguous surfaces of the plate and the part on which it is mounted.

Having thus described my invention what I claim as new and desire to secure by Letters Patent is:

1. A fluid controlling valve comprising the combination of a ported seating member, a ported closure member which is movable angularly in relation to said seating member, a renewable ported plate arranged between and having its faces contiguous with complementary faces of said seating and closure members, and means for holding said plate against rotational movement relatively to one of said members, one of said contiguous faces at each side of said plate being grooved to receive lubricant or sealing substance under pressure for preventing fluid leakage over the faces of said plate.

2. A fluid controlling valve comprising the combination of a ported seating member, a ported closure member which is movable angularly in relation to said seating member, a renewable plate provided with a plurality of ports for the fluid to be controlled and with an aperture for receiving lubricant or sealing substance under pressure, said plate being arranged between and having its faces contiguous with complementary faces of said seating and closure members, and means for holding said plate against rotational movement relatively to one of said members, one of the said contiguous faces at each side of said plate being grooved to receive lubricant or sealing substance from said aperture for preventing fluid leakage over the faces of said plate.

3. A fluid controlling valve comprising the combination of a ported seating member, a ported closure member which is movable angularly in relation to said seating member, a renewable plate provided with a plurality of ports for the fluid to be controlled and with an aperture for receiving lubricant or sealing substance under pressure, said plate being arranged between and having its faces contiguous with complementary faces of said seating and closure members, and means for holding said plate against rotational movement relatively to one of said members, one of said contiguous faces at one side of the said plate being formed around the ports in said plate with a groove adapted to receive lubricant or sealing substance from said aperture for preventing fluid leakage over the adjacent face of said plate, and one of said contiguous faces at the other side of said plate being formed around each of said ports with a groove also adapted to receive lubricant or sealing substance from said aperture for preventing fluid leakage over the adjacent face of said plate.

4. A fluid controlling valve comprising the combination of a ported seating member, a ported closure member which is movable angularly in relation to said seating member, a renewable ported plate provided with an aperture for receiving lubricant or sealing substance under pressure, said plate being arranged between and having its faces contiguous with complementary faces of said seating and closure members, and one of said contiguous faces at each side of said plate being formed with at least one groove to receive lubricant from said aperture for preventing fluid leakage over the adjacent face of said plate, means for holding said plate against rotational movement relatively to one of said members, a non-interruptible connection between said aperture and the groove at the side of said plate adjacent to the last mentioned of said members, an interruptible connection between said aperture and the groove at the other side of said plate, a supply chamber for the lubricant or sealing substance, and an operating stem connected to said closure member, the latter member being formed with a space which communicates with said aperture, and said operating stem being formed with an axial passage through which lubricant or sealing substance can be supplied under pressure from said chamber to said space.

ROBERT WILLIAM LEACH.